United States Patent
Khalili et al.

(10) Patent No.: US 11,036,412 B2
(45) Date of Patent: Jun. 15, 2021

(54) DYNAMICALLY CHANGING BETWEEN LATENCY-FOCUSED READ OPERATION AND BANDWIDTH-FOCUSED READ OPERATION

(71) Applicant: Intel Corporation, Santa Clara, CA (US)

(72) Inventors: Sahar Khalili, Vancouver (CA); Zvika Greenfield, Kfar Sava (IL); Sowmiya Jayachandran, Portland, OR (US); Robert J. Royer, Jr., Portland, OR (US); Dimpesh Patel, Surrey (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/585,801

(22) Filed: Sep. 27, 2019

(65) Prior Publication Data

US 2020/0034061 A1 Jan. 30, 2020

(51) Int. Cl.
*G06F 3/06* (2006.01)
*G06F 12/0862* (2016.01)

(52) U.S. Cl.
CPC ............ *G06F 3/0634* (2013.01); *G06F 3/064* (2013.01); *G06F 3/068* (2013.01); *G06F 3/0611* (2013.01); *G06F 3/0613* (2013.01); *G06F 3/0659* (2013.01); *G06F 12/0862* (2013.01); *G06F 2212/1021* (2013.01); *G06F 2212/602* (2013.01)

(58) Field of Classification Search
CPC .... G06F 3/0634; G06F 3/0611; G06F 3/0613; G06F 3/0659; G06F 3/068; G06F 3/0679; G06F 12/0862; G06F 12/0879; G06F 2212/603; G06F 2212/6022; G06F 2212/1024
See application file for complete search history.

(56) References Cited

U.S. PATENT DOCUMENTS

| | | | |
|---|---|---|---|
| 8,612,676 B2 | 12/2013 | Dahlen et al. | |
| 9,378,142 B2 | 6/2016 | Ramanujan et al. | |
| 9,418,013 B2 | 8/2016 | Anantaraman et al. | |
| 9,430,151 B2 | 8/2016 | Fanning et al. | |
| 2003/0154345 A1 | 8/2003 | Lyon | |
| 2009/0019239 A1* | 1/2009 | Allison | G06F 13/1642 711/151 |
| 2013/0031312 A1 | 1/2013 | Jones et al. | |
| 2015/0378919 A1* | 12/2015 | Anantaraman | G06F 12/0897 711/122 |
| 2019/0213130 A1* | 7/2019 | Madugula | G06F 12/1045 |
| 2020/0034307 A1* | 1/2020 | Duzly | G06F 11/1048 |
| 2020/0159659 A1* | 5/2020 | Dubeyko | G06F 3/061 |

\* cited by examiner

*Primary Examiner* — Tracy A Warren
(74) *Attorney, Agent, or Firm* — Compass IP Law PC

(57) ABSTRACT

A multilevel memory subsystem includes a persistent memory device that can access data chunks sequentially or randomly to improve read latency, or can prefetch data blocks to improve read bandwidth. A media controller dynamically switches between a first read mode of accessing data chunks sequentially or randomly and a second read mode of prefetching data blocks. The media controller switches between the first and second read modes based on a number of read commands pending in a command queue.

17 Claims, 10 Drawing Sheets

DYNAMICALLY CHANGING BETWEEN LATENCY-FOCUSED READ OPERATION AND BANDWIDTH-FOCUSED READ OPERATION

FIELD

Descriptions are generally related to memory reads, and more particular descriptions are related to dynamically swapping between a read mode to focus on latency and a read mode to focus on bandwidth.

BACKGROUND

When a host system issues a read command to a memory or cache layer, there is a latency associated with the execution and completion of the command. The latency for the command is fairly deterministic when there are no other commands pending. However, as the number of outstanding or pending commands from the host increases, the latency is no longer as deterministic. The bandwidth at the storage media will have an impact on the latency of all command completions, except for a command sent when other commands are not pending.

In a system that is sensitive to read latency, the media limitations can have a noticeable performance impact. Thus, systems sensitive to read latency typically optimize media access for read latency. However, bandwidth also translates to latency when there are multiple reads outstanding, and a system can optimize media access for either read latency or bandwidth.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 3-1, FIG. 3-2, and FIG. 3-3 collectively illustrate a swimlane flow diagram of an example of switching between latency mode and bandwidth mode.

Descriptions of certain details and implementations follow, including non-limiting descriptions of the figures, which may depict some or all examples, and well as other potential implementations.

DETAILED DESCRIPTION

As described herein, a multilevel memory subsystem includes a persistent memory device that can access data chunks sequentially to improve read latency, or can prefetch data blocks to improve read bandwidth. Typically, a system can optimize media access for a memory to either improve read latency or to improve bandwidth utilization. As used herein, "optimize" does not necessarily refer to an absolute optimum, but to configuring operation to improve a desired outcome. Thus, to optimize for read latency refers to configuring the system to attempt to provide the best read latency possible in the system. Similarly, to optimize for bandwidth can refer to configuring operation to attempt to achieve the best bandwidth utilization possible for the system.

Instead of optimizing for either read latency or bandwidth, the media controller can switch between a latency mode to optimize for read latency and a bandwidth mode to optimize for bandwidth. Access to the media can be performed either by slice or block, or by sectors or data chunks. When data chunks are read, the reads can be random, causing a possibility of media access collision, which results in delay between random accesses. The access collisions do not occur when reading all chunks in the block so a read of the entire slice can be performed in a way that improves bandwidth utilization. Thus, optimizing for a specific workload type can improve overall bandwidth and read delay.

The media controller switches based on the number of pending commands. Thus, a media controller dynamically switches between a first read mode of accessing data chunks sequentially and a second read mode of prefetching data blocks. The access of data chunks sequentially does not include prefetch of data, and thus, the read latency will be reduced as the system can simply service an incoming command. The access of data with prefetching data blocks having multiple contiguous data chunks allows the media controller to cache data to reduce delay in sending the data over the communication signal lines, improving bandwidth utilization. With data chunk access, data chunks are accessed and sent sequentially, making bandwidth utilization worse. With prefetch, the processing of an incoming command may be delayed to await prefetch of other data, making read latency worse.

The media controller switches between the first and second read modes based on a number of read commands pending in a command queue. In one example, the trigger between the first and second read modes is when there is at least one command pending in the command queue. Other implementations can be to trigger the change between read modes with 2, 3, or some other number of commands queued.

Figure 1:
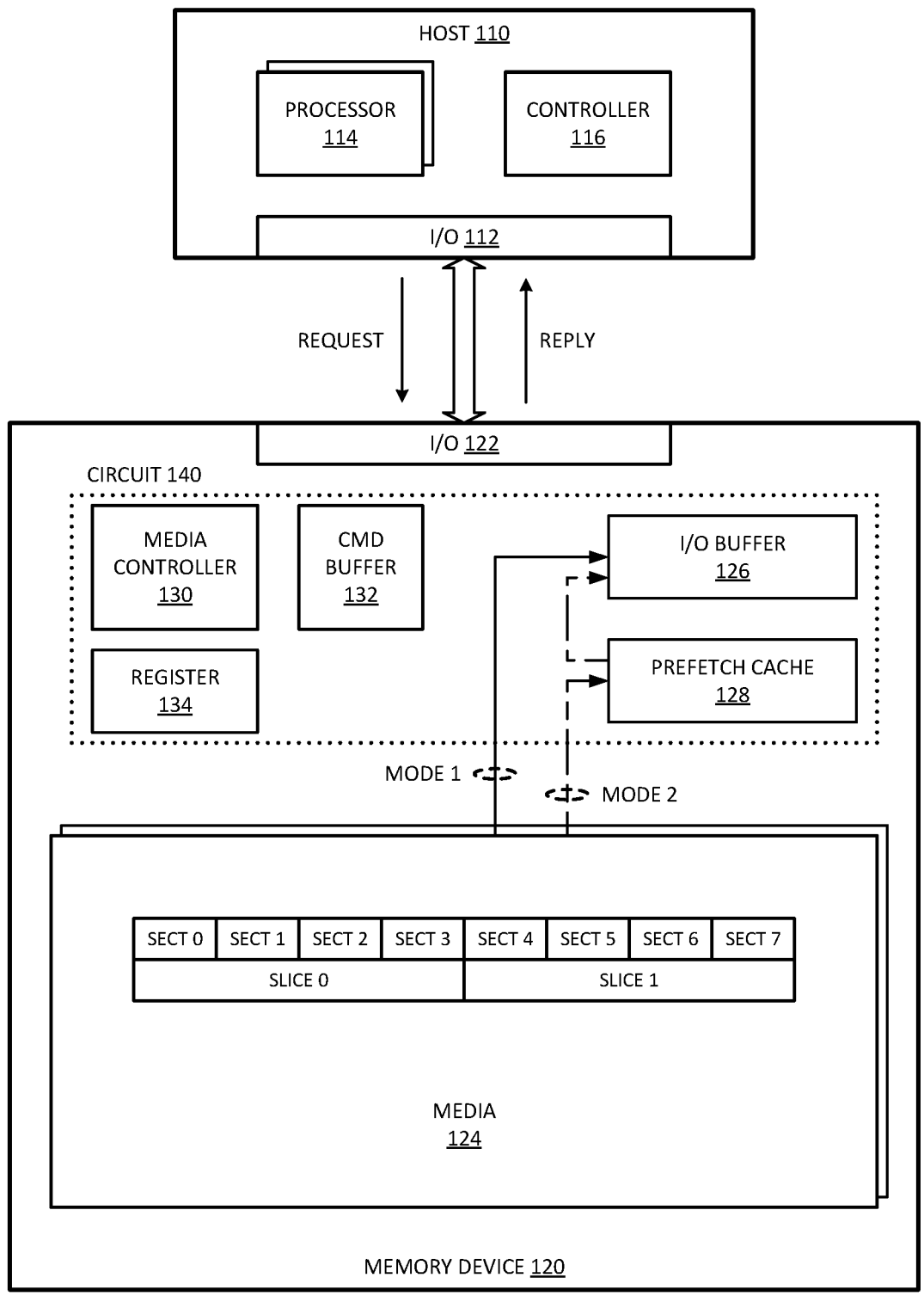
FIG. 1 is a block diagram of an example of a system that can access a storage media with a focus on latency or a focus on bandwidth depending on the number of read requests pending.

FIG. 1 is a block diagram of an example of a system that can access a storage media with a focus on latency or a focus on bandwidth depending on the number of read requests pending. System 100 represents a system in which host 110 access data stored in memory device 120. Memory device 120 includes media 124 to store the data, and media controller 130 to dynamically swap between a read mode focused on read latency and a read mode focused on bandwidth utilization.

I/O (input/output) 112 includes hardware elements to interconnect host 110 to memory device 120. Memory device 120 includes corresponding I/O 122. The I/O includes one or more signal lines to enable host 110 to send commands to memory device 120. The I/O includes one or more signal lines to enable memory device 120 to return data to host 110. In one example, I/O 112 and I/O 122 include separate command and address (CA) signal lines and data (DQ) signal lines. The width of the data bus can vary depending on the architecture. I/O 112 and I/O 122 include transmitters and receivers to drive and receive, respectively, signals on the signal lines, or transceivers to control send and receive on the signal lines. The interface hardware can be controlled through software and firmware operation to control timing and operational parameters of the interface.

I/O (input/output) 112 includes hardware elements to interconnect host 110 to memory device 120. Memory device 120 includes corresponding I/O 122. The I/O includes one or more signal lines to enable host 110 to send commands to memory device 120. The I/O includes one or more signal lines to enable memory device 120 to return data to host 110. In one example, I/O 112 and I/O 122 include separate command and address (CA) signal lines and data (DQ) signal lines. The width of the data bus can vary depending on the architecture. I/O 112 and I/O 114 include transmitters and receivers to drive and receive, respectively, signals on the signal lines, or transceivers to control send and receive on the signal lines. The interface hardware can be controlled through software and firmware operation to control timing and operational parameters of the interface.

Host 110 includes controller 116, which represents control logic to generate the commands and schedule the sending of commands and process returned data based on operations executed by processor 114. In one example, controller 116 is integrated onto a common die with processor 114 (i.e., an integrated controller). In one example, controller 116 is a separate discrete component from processor 114. Controller 116 can implement protocol rules to cause the transfer of signals via the I/O. In one example, controller 116 configures the operation of the transmit and receive components of the I/O. In one example, controller 116 is or includes a scheduler to schedule signaling. Controller 116 can generate the illustrated request to memory device 120, which will provide the illustrated reply in response to the request.

Memory device 120 includes media 124, which represents the storage space on the memory device. In one example, media 124 represents a nonvolatile storage media. Media 124 can be or include a NAND (Not AND) based nonvolatile storage, NOR (Not OR) based nonvolatile storage, or 3DXP (three dimensional crosspoint) nonvolatile storage that stores data based on a resistive state of a bitcell or other resistive-based nonvolatile storage. Media 124 includes multiple addressable storage locations. In one example, the storage locations are addressable by block. In one example, the storage locations are byte-addressable (e.g., 3DXP memory). The block or byte includes individual bitcells to store one or more bits of data (e.g., multilevel cell devices store more than one bit per cell).

In one example, memory device 120 includes multiple media units in accordance with media 124. For example, media 124 can represent a single chip or die or plane of storage space. Memory device 120 can include multiple chips or other units of storage. In one example, media controller 130 interfaces with all media units. In one example, memory device 120 includes different media controllers that can separately control the access to the storage media in accordance with any example described.

Media controller 130 represents a controller or control logic on memory device 120 to control access to media 124. In one example, storage locations of media 124 can be accessed as individual sectors (e.g., Sector[0:7], identified as SECT 0, SECT 1, . . . , SECT 7). In one example, a slice of the storage includes multiple sectors. As illustrated in system 100, Slice 0 includes Sectors[0:3], and Slice 1 includes Sectors [4:7]. There can be a correspondence of slice to sector that is different than the 1:4 illustrated.

Media controller 130 receives commands for execution from host 110, identified as "Request" in system 100. Each request has an associated command latency, which is a minimum expectation for completion of the command. There is a relationship between bandwidth and latency that can be described as follows. The first command received after the controller becomes idle has a deterministic latency, while subsequent commands in a series or burst of command have less deterministic because it is not always known how long it will take to complete the command. The last command of the burst will have to wait until all previous commands have completed before it can issue its completion. It will be understood that the higher the bandwidth, the shorter the wait for subsequent commands.

In a system that is sensitive to read latency, media access limitations can have a noticeable performance impact, which suggests optimizing command processing for read latency. However, lack of bandwidth can result in latency when there are multiple reads outstanding or pending in command (cmd) buffer 132, which can also be referred to as the command queue. The media read may have an optimal read granularity for an amount of data, and many reads may be for less data than the optimal amount. For purposes of discussion herein, a "slice" refers to the native read bandwidth, or the amount of data the media is capable of reading in one unit cycle or clock cycle. A "chunk" of data refers to an amount of data that is smaller than a slice; thus, a slice is made up of multiple chunks of data.

In one example, media 124 requires significant idle time after a read to avoid address collision. Address collision refers to a situation when a subsequent command addresses the same portion of the media as a previous command. When the portion of the media is being accessed for one command, it cannot be simultaneously accessed for another command, given that the control logic cannot simultaneously address different locations within the portion. The idle time is required before the same address or a portion of the media with the address in it (e.g., up to a 1 GByte portion of the media for some 3DXP implementations). The added delay for the idle time reduces bandwidth, which results in increased latency with command queue depths larger than 1.

To improve bandwidth, the layout for media 124 can be organized in a way that reading full media slices sequentially would not result in media address collisions. It will be understood that the host address or the address provided by host 110 is not necessarily the same as the media address. Media controller 130 controls the media address, which can be transparent to host 110. In one example, media 124 has a sequential pattern of approximately 2K bytes. In such a configuration, the slices can include 2K bytes), where each slice includes multiple 512 byte sectors. In one example, the layout is optimized for access to slices rather than access to sectors.

At the media level for such a configuration, reading only one sector would be optimized for latency. Memory device 120 will return the requested sector back to host 110 as quickly as media controller 130 can read the requested sector. However, if all the host reads translate to media sector reads, there will be processing delays as a result of media address collisions. The media address collisions would translate into reduced bandwidth, which in turn translates to increased latency for queue depths larger than one. The increased latency would slow down processor 114 and make the user experience less than optimal.

In one example, memory device 120 includes byte-addressable nonvolatile storage media that can couple to a traditional system memory bus. Thus, for example, memory device 120 can share a bus with traditional volatile memory such as DRAM (dynamic random access memory). Memory traffic on client systems can include by 64 byte random access read workloads with the volatile memory and larger sequential access workloads that can be 32 times larger than the 64 byte random access reads. In one example, the ability to optimize for either read latency or bandwidth can allow optimization for both types of workloads—either the 64 byte or the 2K byte accesses.

Random read latency is critical for many applications, especially if the storage device is to be used as an nth level memory in an N-level memory system. For example, a two-level memory system includes near memory and far memory, where near memory has faster access time and far memory has a slower access time. The access times may differ because of device architecture (e.g., devices of different types that have different access latencies), different electrical distance from the host, or a combination of electrical distance and device architecture.

Media controller 130 can provide optimization for both latency and bandwidth for media 124. In one example, system 100 changes the translation of host reads to media reads to eliminate or reduce the impact of media address collision on host read bandwidth for both sequential and random reads. In one example, media controller 130 prioritizes latency optimization while the request pressure is low, or when there are few pending requests. As the command queue or queues fill up and latency becomes longer, media controller 130 dynamically switches to prioritize bandwidth optimization. With such operation by media controller 130, when the command queues are fuller, a secondary benefit of optimizing bandwidth is that latency gets optimized as well.

Referring to a configuration where data on media 124 can be considered organized as sectors and slices, different read modes can be considered a sector-read mode and a slice-read mode. The sector-read mode can refer to a mode where media controller 130 accesses data one sector at a time, in response to a request for a specific sector. The slice-read mode can refer to a mode where media controller 130 prefetches a slice of data in response to a request for a specific sector.

In such an example, when the first read is for one sector only, the latency can be optimized by reading only the requested sector as opposed to the entire slice. In general, when there are multiple reads outstanding, the latency can be optimized by increasing bandwidth utilization. In turn, bandwidth utilization can be optimized by reading an entire slice of data, which can reduce address collision delays.

Media controller 130 can dynamically identify when to switch from sector-read mode to slice-read mode. The determination by media controller 130 to read an entire slice is made based on the control of access to media 124, regardless of whether the host requests only a sector or an entire slice. Thus, the media controller can access only the sector or an entire slice in response to a request for a sector, send the requested data back to the host, and cache or buffer the rest of the data. If the host sends another request for a sector of the slice soon after the media controller prefetches the data, the workloads from the host will be benefited by latency improvements.

In one example, when there are no reads outstanding, media controller 130 will be in sector-read mode to optimize for latency. The switch from sector-read mode to slice-read mode or prefetch mode will depend on the number of pending read requests that trigger a switch between modes. Once the number of outstanding reads has reached a programmable threshold, media controller 130 switches to slice reads and prefetching data. In one example, the threshold is a programmable value. For example, the programmable value could be stored in a register device. In one example, the threshold is a fixed value or a hardcoded value. A hardcoded value could be part of controller firmware, for example, or set as a value in fuses.

In one example, memory device 120 includes register 134 to store configuration information related to the access of media 124 by media controller 130. In one example, register 134 represents multiple registers or storage locations to store configuration information. In one example, register 134 is part of media controller 130. In one example, register 134 stores a programmable value to set a threshold number that trigger media controller 130 to switch from one read mode to another. For example, register 134 can include a value set in configuration or initialization of memory device 120 to switch from a default read access mode to a different read access mode. More specifically, register 134 can store a value to indicate a number of commands pending in command buffer 132 that will trigger media controller 130 to switch from a default read latency optimization to a bandwidth optimization. In one example, when the queue is emptied, media controller 130 switches back to the default read access mode. In one example, memory device 120 includes a register 134 to store a value to indicate a number of pending commands that will trigger media controller 130 to switch back from bandwidth optimization read access mode to a default read latency optimization read access mode. In one example, the sector-read mode or a read mode without prefetching is the default read mode, and a read mode with prefetch is the other mode switched to in response to a queue depth.

The descriptions above refer to control by media controller 130 to implement a dynamic switch from one read mode to another read mode. In an alternative example, controller 116 can implement the dynamic switch described. The dynamic switching could occur in accordance with what is described above, where controller 116 issues commands for either a sector (or a sub-portion of media 124) when in one read mode, and issues commands for a slice (or a portion of media 124 that includes multiple sub-portions). The sub-portion and portion distinction can be based on a unit access to memory device 120 and a unit prefetch for media 124, respectively.

When controller 116 implements the change in read mode, the controller will send different read commands to memory device 120. Controller 116 can include a command buffer or command queue (not explicitly shown) that can be used to determine when to switch read modes. Controller 116 can switch back in response to receipt of data for all outstanding requests, as an example.

In one example, media controller 130 (or controller 116) configure system 100, including configuration that sets a queue depth that will trigger a change from one read mode to another read mode, referring to a number of pending commands in command buffer 132 (or a comparable command buffer for controller 116). In one example, the configuration can include a queue depth to trigger switching from reading chunks of data to reading blocks of data with prefetch, and when the queue is emptied the controller automatically switches back to reading chunks of data. In one example, the configuration can include a queue depth to trigger switching from reading chunks to reading blocks, and another queue depth indication can trigger switching back to reading chunks of data, where the queue is not completely emptied prior to switching back.

As illustrated, memory device 120 includes I/O (input/output) buffer 126 as a buffer to send data from media 124 through I/O 122 to host 110. I/O buffer 126 represents a buffer for queuing up data to send to host 110. The I/O buffer is used in both Mode 1 and Mode 2. In one example, I/O buffer 126 is part of I/O 122. The I/O buffer is specified separately for purposes of discussion regarding the two read modes.

As illustrated, in Mode 1, data from media 124 is accessed and provided directly to I/O buffer 126 for sending to host 110. For Mode 2, data is first accessed and placed in prefetch cache 128 (which could also be referred to as a prefetch buffer), and is then provided to I/O buffer 126 in response to a request from host 110. It will be understood that not all data stored in prefetch cache 128 will be sent to host 110. In one example, in response to a request while operating in the prefetch access mode (Mode 2), media controller 130 will first look in prefetch cache 128 for requested data. If there is a cache hit, the data can be moved to I/O buffer 126. If there is a cache miss, media controller 130 will prefetch data associated with the requested data and store the prefetched data in prefetch cache 128. The requested data will be sent to host 110, while the other data remains cached until requested, or until evicted in accordance with a cache eviction operation implemented by media controller 130.

In one example, for a cache hit in prefetch cache 128, other commands may already be ahead of the command for sending data back to host 110. For example, I/O buffer 126 can have multiple chunks of data queued to send in response to previous commands. When a command results in a cache hit, the command can be queued in order for I/O output, and media controller 130 does not need to perform additional access operations on media 124 because the data is already cached in prefetch cache 128.

In one example, memory device 120 includes circuit 140, which represents a circuit that enables switching between read modes based on queue depth. In one example, circuit 140 is a circuit integrated onto a component of memory device 120. In one example, circuit 140 is implemented as an application specific integrated circuit (ASIC). Such a circuit could be integrated onto a component, or separately packaged. Thus, circuit 140 can be provided as a standalone chip or circuit device to be integrated into memory 120, as a chip to be integrated in a system on a chip, or integrated into the silicon of another component of memory device 120.

Figure 2A:
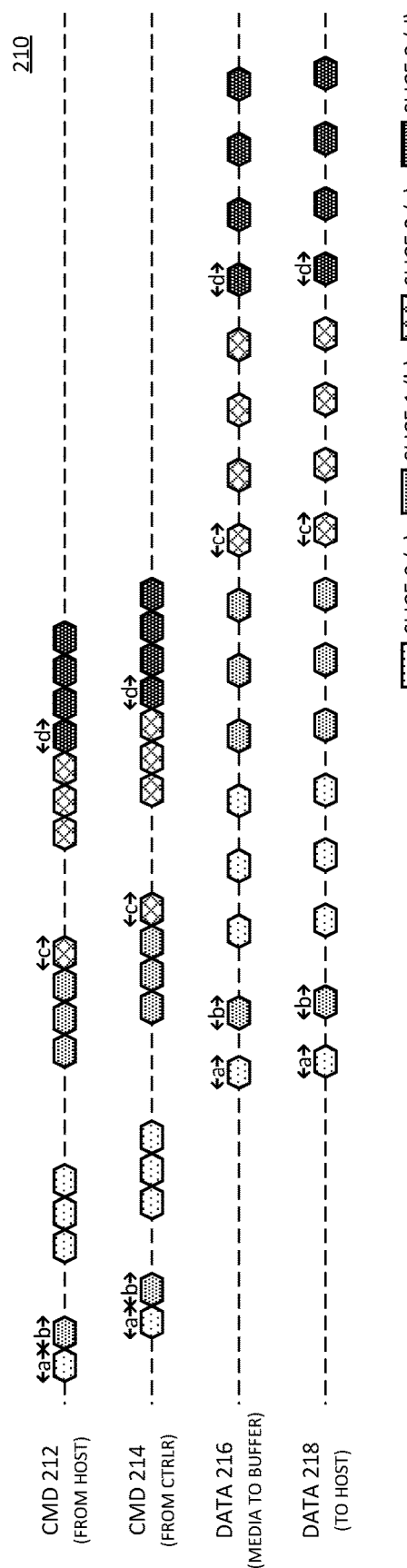
FIG. 2A is a timing diagram of an example of command sequencing focusing on latency for queue depth of 1 read.

FIG. 2A is a timing diagram of an example of command sequencing focusing on latency for queue depth of 1 read. Diagram 210 represents commands send from a host and responded to from the memory device. Diagram 210 represents commands from the host and operation at the media controller and media based only on read latency optimization.

CMD (command) 212 represents commands or read requests sent by the host. Each element illustrated represents a separate command for a separate chunk of data. The commands are indicated by shading to indicate what portion of data a chunk is associated with. The legend indicates Slice 0 for chunks with shading (a), Slice 1 for chunks with shading (b), Slice 2 for chunks with shading (c), and Slice 3 for chunks with shading (d). Diagram 210 represents a scenario where there are commands sent for chunks of different portions or slices, interleaved with each other.

For example, CMD 212 represents a request for a chunk of data from Slice 0 followed by a request for data from Slice 1. After some period of time, the host sends three more consecutive requests for chunks of data from Slice 0. After a period of time, the host sends three more consecutive requests for chunks of data from Slice 1, followed by a request for data from Slice 2. The host then sends commands for chunks of Slice 2 followed by commands for chunks of Slice 3.

CMD 214 represents command encoding from the controller to the storage media. The host generates commands illustrated in CMD 212 to request specific chunks of data. CMD 214 represents the commands generated by the media controller to access the media. When the controller optimizes only for read latency, in response to each command from the host, the controller generates a separate command for each chunk of data.

Data 216 represents operation at the media to provide to a buffer. In the case of pure read latency optimization, the buffer can be an output buffer to send to the host. Data 218 represents operation at the output driver between the memory device and the host. It will be observed that the different between Data 216 and Data 218 is a short delay to get the data from the buffer to the output driver. The data in the buffer and the data to the host both occur as single chunks of data, mirroring the requests from the host in CMD 212.

Figure 2B:
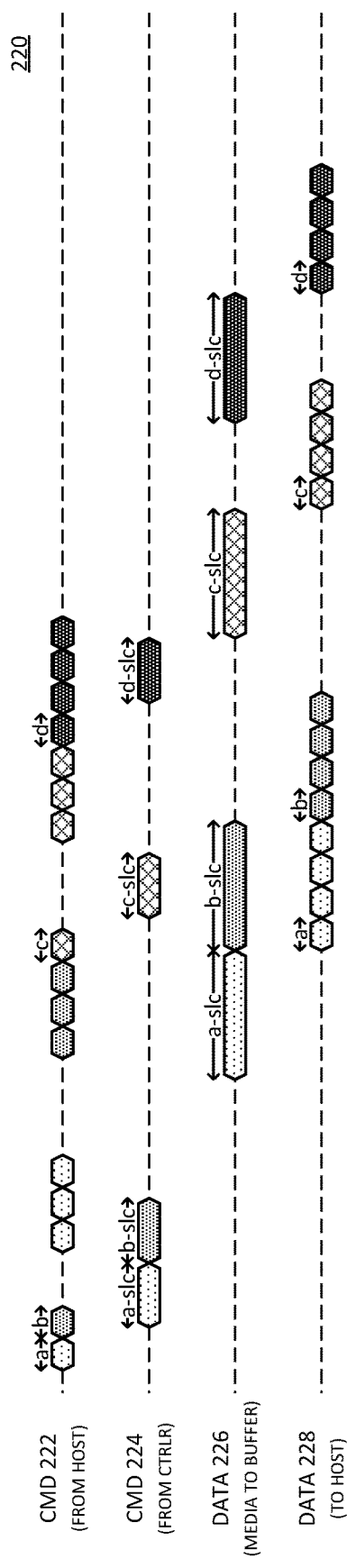
FIG. 2B is a timing diagram of an example of command sequencing focusing on bandwidth for reads larger than queue depth of 1.

FIG. 2B is a timing diagram of an example of command sequencing focusing on bandwidth for reads larger than queue depth of 1. Diagram 220 represents commands sent from a host and responded to from the memory device. Diagram 220 represents commands from the host and operation at the media controller and media based only on bandwidth optimization. More specifically, the media controller prefetches or reads an entire slice in response to a host read for a sector. Such an approach optimizes for bandwidth and sacrifices read latency for queue depth of 1 (QD1) reads.

CMD 222 represents commands or read requests sent by the host. Each element illustrated represents a separate command for a separate chunk of data. The commands are indicated by shading to indicate what portion of data a chunk is associated with. The legend indicates Slice 0 for chunks with shading (a), Slice 1 for chunks with shading (b), Slice 2 for chunks with shading (c), and Slice 3 for chunks with shading (d). Diagram 220 represents a scenario where there are commands sent for individual chunks or sectors of different portions or slices, interleaved with each other.

For example, CMD 222 represents a request for a chunk of data from Slice 0 followed by a request for data from Slice 1. After some period of time, the host sends three more consecutive requests for chunks of data from Slice 0. After a period of time, the host sends three more consecutive requests for chunks of data from Slice 1, followed by a request for data from Slice 2. The host then sends commands for chunks of Slice 2 followed by commands for chunks of Slice 3.

CMD 224 represents command encoding from the controller to the storage media. The host generates commands illustrated in CMD 222 to request specific chunks of data. CMD 224 represents the commands generated by the media controller to access the media. When the controller optimizes only for bandwidth, in response to each command from the host, the controller generates a command for an entire slice of data. It will be understood that because the entire slice is prefetched, CMD 224 illustrates only a single command to the media to read the entire slice of data.

Data 226 represents operation at the media to provide to a buffer. In the case of bandwidth optimization, the buffer can be a prefetch cache, which will hold the data until it is transferred to an output buffer to send to the host. It will be observed that there is a delay from CMD 224 to the slice prefetch illustrated in Data 226. The delay causes extra read delay with respect to the first chunk of Slice 1 requested, as the system has to wait until all of Slice 0 is prefetched before accessing any of Slice 1.

Data 228 represents operation at the output driver between the memory device and the host. Whereas Data 226 illustrates one unified operation to read the data slice, Data 228 illustrates each chunk of data sent back to the host. Data 228 illustrates a configuration where all data is sent back to the host by slices. Thus, even though the first chunk of data for Slice 1 was requested prior to the remaining data in Slice 0, all of Slice 0 is returned to the host prior to returning all of the data for Slice 1. It will be observed that data is not returned until requests have been received for all the data for a slice, thus maximizing bandwidth at the expense of latency. If slice 1 (data 226) is ready before all of slice 0 is sent to the host (data 228), the response of slice 1 will be sent before slice 0.

Figure 2C:
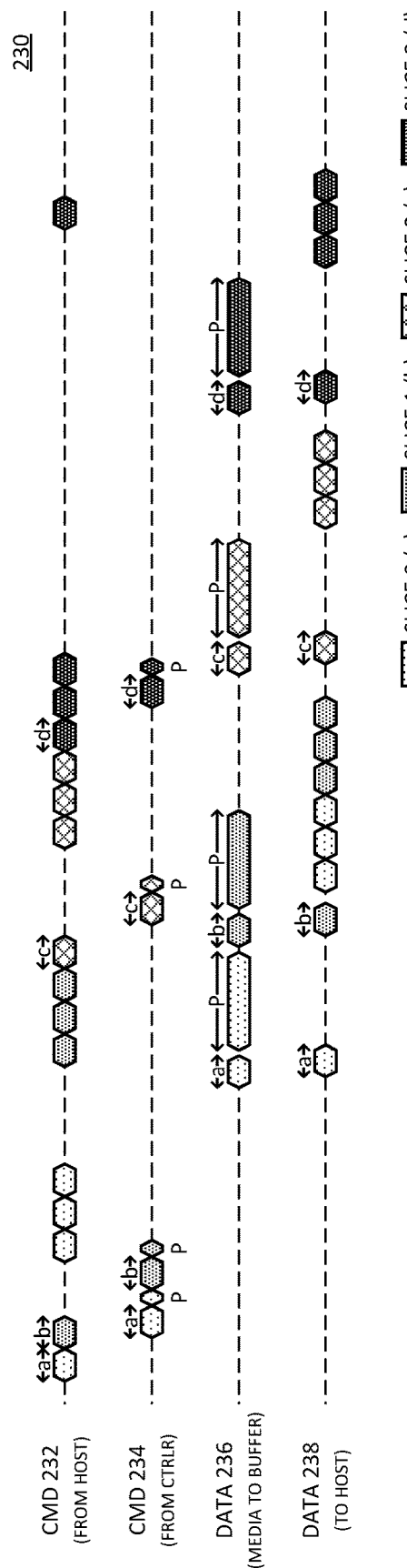
FIG. 2C is a timing diagram of an example of command sequencing focusing on bandwidth for queue depth of 1 read with prefetch after servicing a specific read.

FIG. 2C is a timing diagram of an example of command sequencing focusing on latency for queue depth of 1 read with prefetch after servicing a specific read, which can somewhat improve bandwidth for larger queue depths. Diagram 230 represents commands sent from a host and responded to from the memory device. Diagram 230 represents commands from the host and operation at the media controller and media based on bandwidth optimization at the media, but allows for some read latency optimization at the connection between the memory device and the host.

More specifically, the media controller reads a chunk of data requested by the host, followed by a prefetch operation to read the rest of the slice associated with the chunk of data. Such a prefetch approach has a similar effect of reducing address collisions and improving bandwidth. In accordance with diagram 230, the media controller can respond to the host as soon as the sector is read without having to wait until the entire slice is read (QD1 latency optimization).

CMD 232 represents commands or read requests sent by the host. Each element illustrated represents a separate command for a separate chunk of data. The commands are indicated by shading to indicate what portion of data a chunk is associated with. The legend indicates Slice 0 for chunks with shading (a), Slice 1 for chunks with shading (b), Slice 2 for chunks with shading (c), and Slice 3 for chunks with shading (d). Diagram 230 represents a scenario where there are commands sent for individual chunks or sectors of different portions or slices, interleaved with each other.

For example, CMD 232 represents a request for a chunk of data from Slice 0 followed by a request for data from Slice 1. After some period of time, the host sends three more consecutive requests for chunks of data from Slice 0. After a period of time, the host sends three more consecutive requests for chunks of data from Slice 1, followed by a request for data from Slice 2. The host then sends commands for chunks of Slice 2 followed by commands for chunks of Slice 3.

CMD 234 represents command encoding from the controller to the storage media. The host generates commands illustrated in CMD 232 to request specific chunks of data. CMD 234 represents the commands generated by the media controller to access the media. In one example, the media controller generates a command for a chunk of data in response to a host request for that chunk of data. The media controller then issues a prefetch command (labeled as "P") to cause the media to read the rest of the slice of data.

Data 236 represents operation at the media to provide to a buffer. In accordance with diagram 230, data read can be provided to an output buffer for the requested data, and the prefetched data placed in a prefetch cache.

Data 238 represents operation at the output driver between the memory device and the host. Data 238 illustrates that the first requested chunk of data can be returned as soon as it is read, which improves read latency. As other commands for the same slice are received, the data can be returned from the prefetch cache.

Figure 2D:
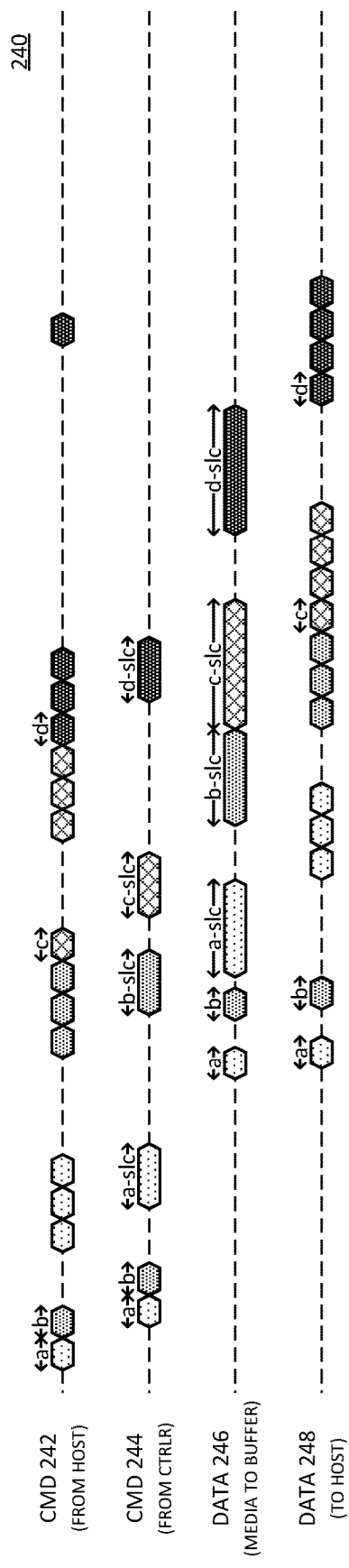
FIG. 2D is a timing diagram of an example of command sequencing switching between a latency mode and a bandwidth mode based on the number of commands pending.

FIG. 2D is a timing diagram of an example of command sequencing switching between a latency mode and a bandwidth mode based on the number of commands pending. Diagram 240 represents commands send from a host and responded to from the memory device. Diagram 240 represents commands from the host and operation at the media controller and media based on one read mode for latency optimization and a read mode for bandwidth optimization. The media controller dynamically determines how to switch between the two read modes. Diagram 240 represents a command exchange that could occur with a system in accordance with system 100 of FIG. 1.

CMD 242 represents commands or read requests sent by the host. Each element illustrated represents a separate command for a separate chunk of data. The commands are indicated by shading to indicate what portion of data a chunk is associated with. The legend indicates Slice 0 for chunks with shading (a), Slice 1 for chunks with shading (b), Slice 2 for chunks with shading (c), and Slice 3 for chunks with shading (d). Diagram 230 represents a scenario where there are commands sent for individual chunks or sectors of different portions or slices, interleaved with each other.

For example, CMD 242 represents a request for a chunk of data from Slice 0 followed by a request for data from Slice 1. After some period of time, the host sends three more consecutive requests for chunks of data from Slice 0. After a period of time, the host sends three more consecutive requests for chunks of data from Slice 1, followed by a request for data from Slice 2. The host then sends commands for chunks of Slice 2 followed by commands for chunks of Slice 3.

CMD 244 represents command encoding from the controller to the storage media. The host generates commands illustrated in CMD 242 to request specific chunks of data. CMD 244 represents the commands generated by the media controller to access the media. In one example, the media controller generates a command for a chunk of data in response to a host request for that chunk of data. The host can continue to generate commands for other chunks of data to different slices until receiving a command for a second chunk of data to the same slice. While the second chunk is used as a trigger for purposes of the example in diagram 240, it could be the third chunk, fourth chunk, or some other nth request. In one example, diagram 240 illustrates a configuration with a queue depth of 2 that triggers a switch from latency mode to bandwidth mode. In one example, the queue depth can refer to the number of pending reads to the same slice of data.

The number of commands set as a threshold to trigger the switch in read mode will depend on the system configuration, the chunk and slice sizes relative to each other, or other factors. When chunks of data are ¼ the total slice size, prefetching in response to the second command could make sense. If the chunk of data is ⅛ or 1/16 the slice size, or some other size, the system may be benefited by having a queue depth greater than 1 as the trigger.

As illustrated, in response to the request for the first chunk of Slice 0, the media controller issues a command to read the requested chunk. The same is true for the first chunk of Slice 1. In response to the request for the second chunk of Slice 0, it will be observed that the media controller switches to issuing a slice read command in response to the sector read command. Thus, even a command for a single chunk will result in a slice being read when the controller is in bandwidth mode, unless the slice has already been prefetched. The slice read command indicates a switch from the read mode focused on latency to the read mode focused on bandwidth. Thus, in response to the requests for the first chunks of Slices 2 and 3, respectively, the media controller issues commands to prefetch the entire slices.

Data 246 represents operation at the media to provide to a buffer. In read latency mode, the buffer can be directly to an output buffer. In bandwidth mode, the buffer can be a prefetch buffer, which will be sent to the output buffer to send to the host. It will be observed that the first two commands are for the first two chunks, and the remaining commands are executed with prefetch reads.

Data 248 represents operation at the output driver between the memory device and the host. Data 248 illustrates that data accessed in the latency mode can be returned as soon as it is read, which improves read latency. After switching to bandwidth mode, the memory device can send data to the host in response to a request for the data, based on the prefetched data.

In accordance with diagram 240, it will be understood that a system can request patterns from the host that desire small low latency reads or high bandwidth sequential reads, and dynamically modify the memory access pattern to media to improve performance for the specific workload. In one example, the optimization occurs in two parts: first detecting the incoming workload, and second implementing a read cache with a pre-fetcher, allowing the data access pattern to media be optimized for sequential bandwidth without wasting bandwidth with unnecessary reads.

Dynamically changing read mode allows the system to dynamically optimize media access for different read queue depths and access patterns. The switching of optimizations can increase the efficiency and speed of sequential reads from the media by eliminating media address collisions, while still retaining latency optimizations for small queue depth random reads where the user is most likely to notice latency impacts.

In bandwidth mode, any host reads, even reads for a portion of a slice, result in the entire slice being read and cached internally. The internal caching can refer to a cache on or controlled by the controller, or a cache accessible to the controller. Future host reads to a prefetched slice can be completed from the internal cached data without generating another media read. In one example, once all reads are processed and the controller goes idle, either as part of the idle process, or as a part of a process of awaking from the idle state, the controller can automatically switch back from bandwidth mode to latency mode. The controller would again switch back to bandwidth mode in response to a threshold number of read commands pending in a command queue. In one example, for a system with a queue that buffers both read and write commands, only the read commands count towards the threshold, and write commands in the queue can be ignored for considering whether to switch read modes. Similarly, the controller going idle can refer to a read process going idle, and may not refer to whether there are still pending write commands.

Figures 1, 3:
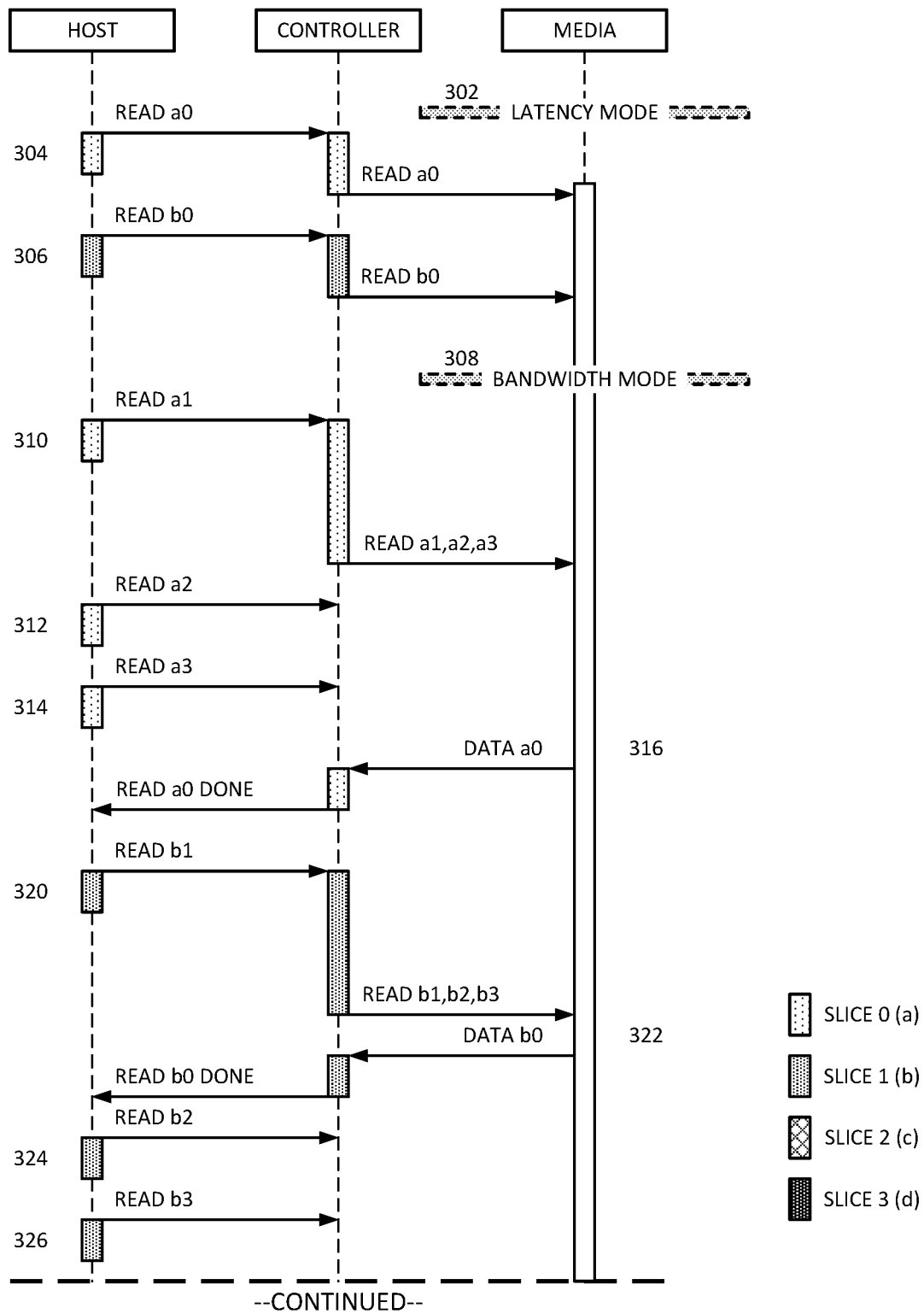
Figures 2, 3:
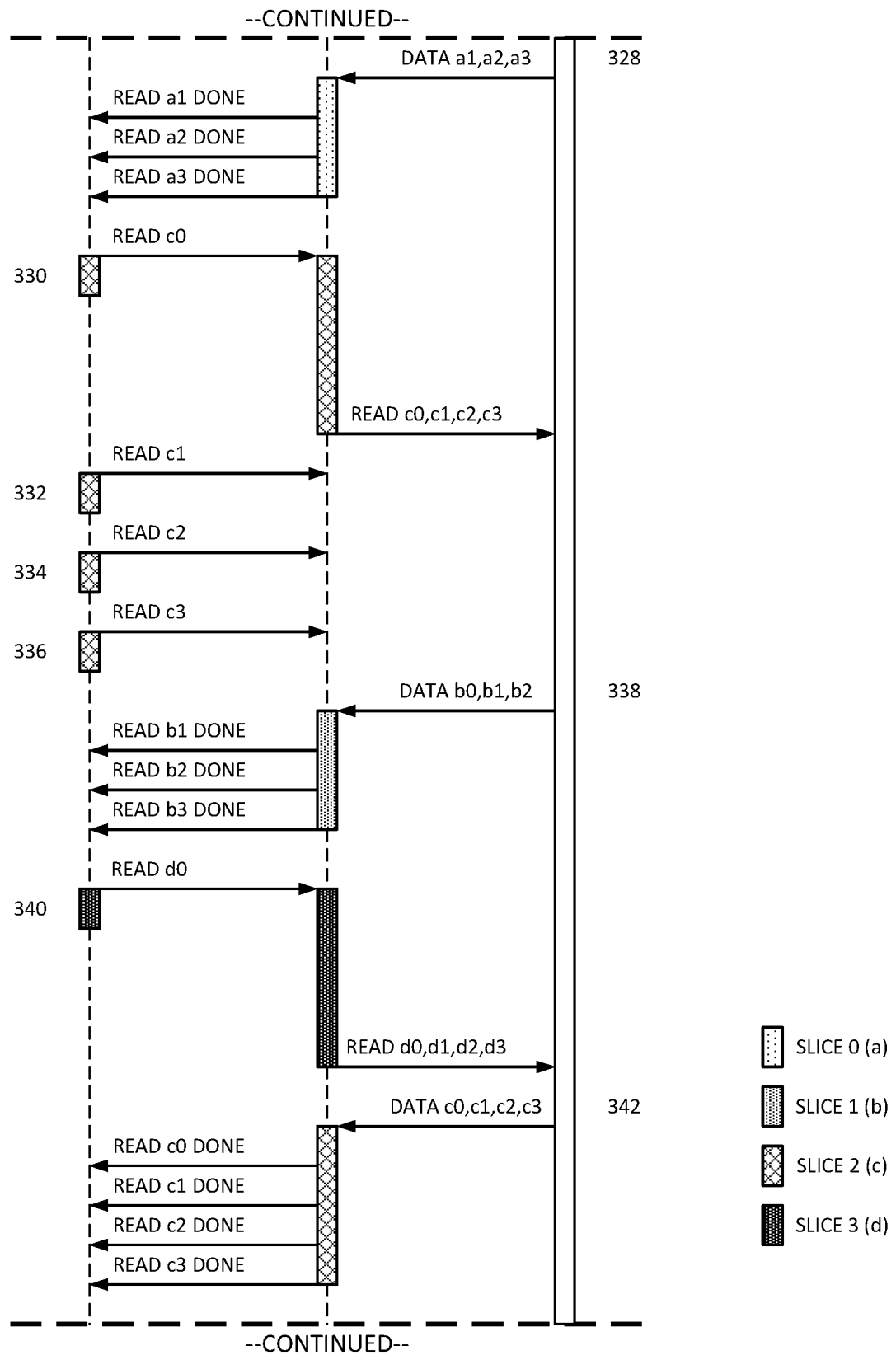
Figure 3:
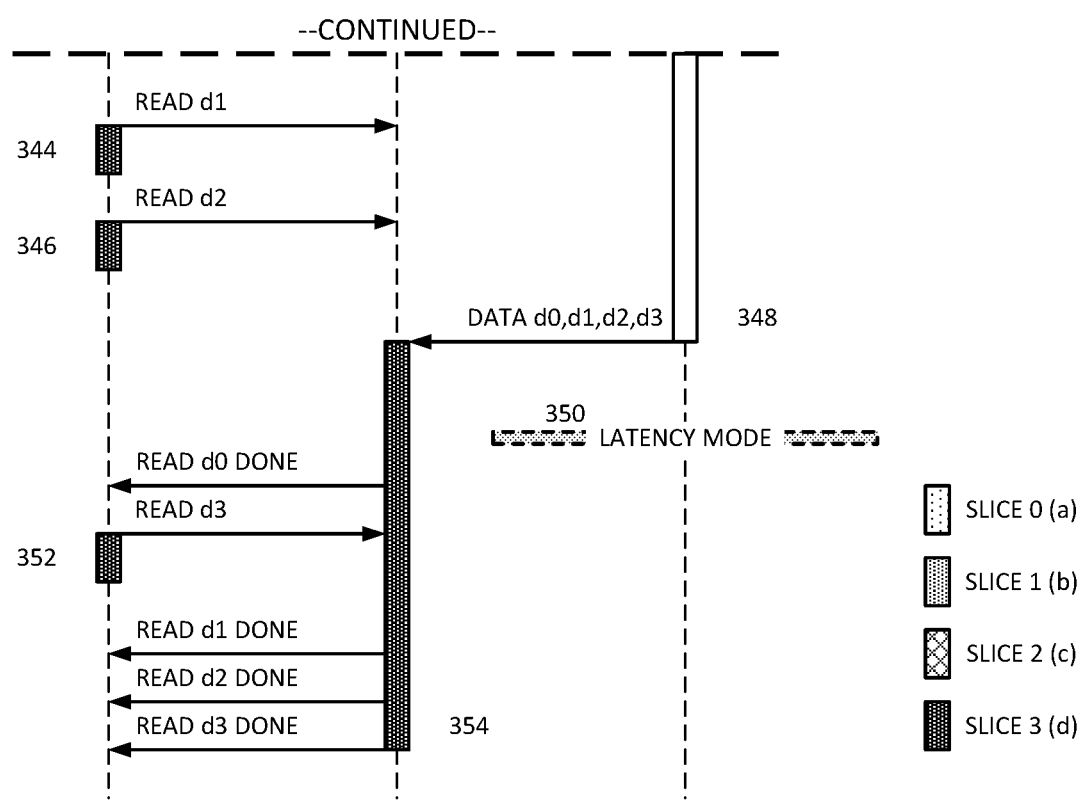

FIG. 3-1, FIG. 3-2, and FIG. 3-3 collectively illustrate a swimlane flow diagram of an example of switching between latency mode and bandwidth mode. The diagram is separated into three portions: FIG. 3-1, FIG. 3-2, and FIG. 3-3, to accommodate page size. Flow 300 illustrates an example of a sequence illustration for diagram 240 of FIG. 2D.

Starting with FIG. 3-1, at initialization point 302, access to the media by the controller is based on latency mode. At event 304, the host generates a command Read a0, which is a request for Sector 0 of Slice 0. The controller receives the command and generates a Read a0 command for the media. At event 306, the host generates a command Read b0, which is a request for Sector 0 of Slice 1. The controller receives the command and generates a Read b0 command for the media.

In one example, in response to the second read command, the controller triggers bandwidth mode, or bandwidth read mode at point 308. At event 310, the host generates a command Read a1, for Sector 1 of Slice 0. In one example, the host may actually generate this command prior to the controller entering bandwidth mode. However, to illustrate that the command will be processed in bandwidth mode, it is shown subsequent to point 308 in flow 300. It will be understood that the command could actually be sent prior to a switch of read modes, but since this comes after the threshold number of reads, it will be processed in bandwidth mode.

Once in bandwidth mode, in response to a read for a slice or a portion of a slice, the controller triggers prefetch of the entire slice, as long as data for that slice has not been prefetched already. Multiple reads to the same slice can be queued up and wait until the slice read is completed. In one example, once the slice read is executed and the data is available in an internal prefetch buffer, the data can be returned to the host for all queued reads for that slice. In one example, all subsequent reads to a prefetched slice will be completed from the internal prefetch buffer and will not initiate a read from the media.

As illustrated, in response to Read a1, the controller generates a command for the media Read a1, a2, a3, to complete the prefetch for Slice 0. At event 312, and at event 314, the host generates, respectively, Read a2 and Read a3. The stopping of the arrows at the controller in flow 300 indicates that the controller queues the command without sending another command to the media. Once the media has completed the read of a0, at event 316 the media returns Data a0 to the controller, which returns the data to the host to trigger Read a0 Done.

Since the system is already in bandwidth mode, when the host generates the command Read b1 at event 320, the controller generates a command or commands for Read b1, b2, b3 to the media to complete the prefetch of Slice 1. At event 322 the media completes the read of Data b0, which it sends to the controller. The controller in turns provides the data to the host to trigger Read b0 Done.

In one example, the host subsequently generates commands Read b2 and Read b3 at event 324 and event 326, respectively. In response to these commands, the controller again queues the commands without accessing the media, since the data slice has already been requested for prefetch.

Continuing flow 300 at FIG. 3-2, the media completes the prefetch of the remainder of Slice 0 at event 328, returning Data a1, a2, a3. Since commands for all of these sectors have already been received, the controller can cache the data and sent it to the host in sequence to trigger Read a1 Done, Read a2 Done, and Read a3 Done. For any data sector that had not been requested, the controller could continue to cache the data until such time as a request for it may be received.

At event 330, the host generates command Read c0. Since there are still pending reads for Slice 1, the controller may remain in bandwidth mode. Thus, in response to Read c0, the controller can generate a command or commands for Read c0, c1, c2, c3 to read the entirety of Slice 2 in response to the command for c0. Flow 300 illustrates subsequent commands Read c1 at event 332, Read c2 at event 334, and Read c3 at event 336. In response to these commands, the controller can queue the commands without accessing the media.

At event 338, the media completes the prefetch for the data of Slice 1, which it sends to the controller as Data b0, b1, b2. The controller can then respond to the requests from the host by sending the data, to trigger Read b1 Done, Read b2 Done, and Read b3 Done.

At event 340, the host generates command Read d0 for a sector of data from Slice 3. The system is still in bandwidth mode, and so the controller can generate a command or commands for Read d0, d1, d2, d3 to the media. At event 342, the media returns Data c0, c1, c2, c3 for Slice 2 to the controller. Since all data has been requested, the controller can send the data to the host to trigger Read c0 Done, Read c1 Done, Read c2 Done, and Read c3 Done.

Continuing flow 300 at FIG. 3-3, at event 344 the host generates command Read d1 and, at event 346, Read d2. In response to these requests, the controller can simply queue the commands since the data of Slice 3 has already been requested from the media. At event 348, the media returns Data d0, d1, d2, d3 in response to the prefetch request. In one example, the return of the data for Slice 3 completes all pending read commands, and the controller can switch to latency mode at 350.

With event 348, the controller has all data prefetched for Slice 3. Consider that after sending data d0 to the host to trigger Read d0 Done, the host generates command Read d3 at event 352. The controller can continue to send Data d1 and Data d2 to trigger, respectively, Read d1 Done and Read d2 Done at the host. Also, since Data d3 has been prefetched, the controller can simply return the data at event 354 to trigger Read d3 Done.

It will be understood that since the controller switched back to latency mode, the controller is prepared for a subsequent burst of reads, and the initial latency mode can provide good initial read latency. A subsequent switch to bandwidth mode can improve latency by prefetching data once the burst is already in process.

In one example, the controller marks the data in the prefetch buffer as invalid when a write to the corresponding media address is received. In one example, when the prefetch buffer is full, the controller will evict prefetched data in accordance with a cache eviction process. A simple cache eviction routine is a FIFO (first in, first out) approach, where the oldest entries will be deleted to prefetch data to process a new read.

Figure 4:
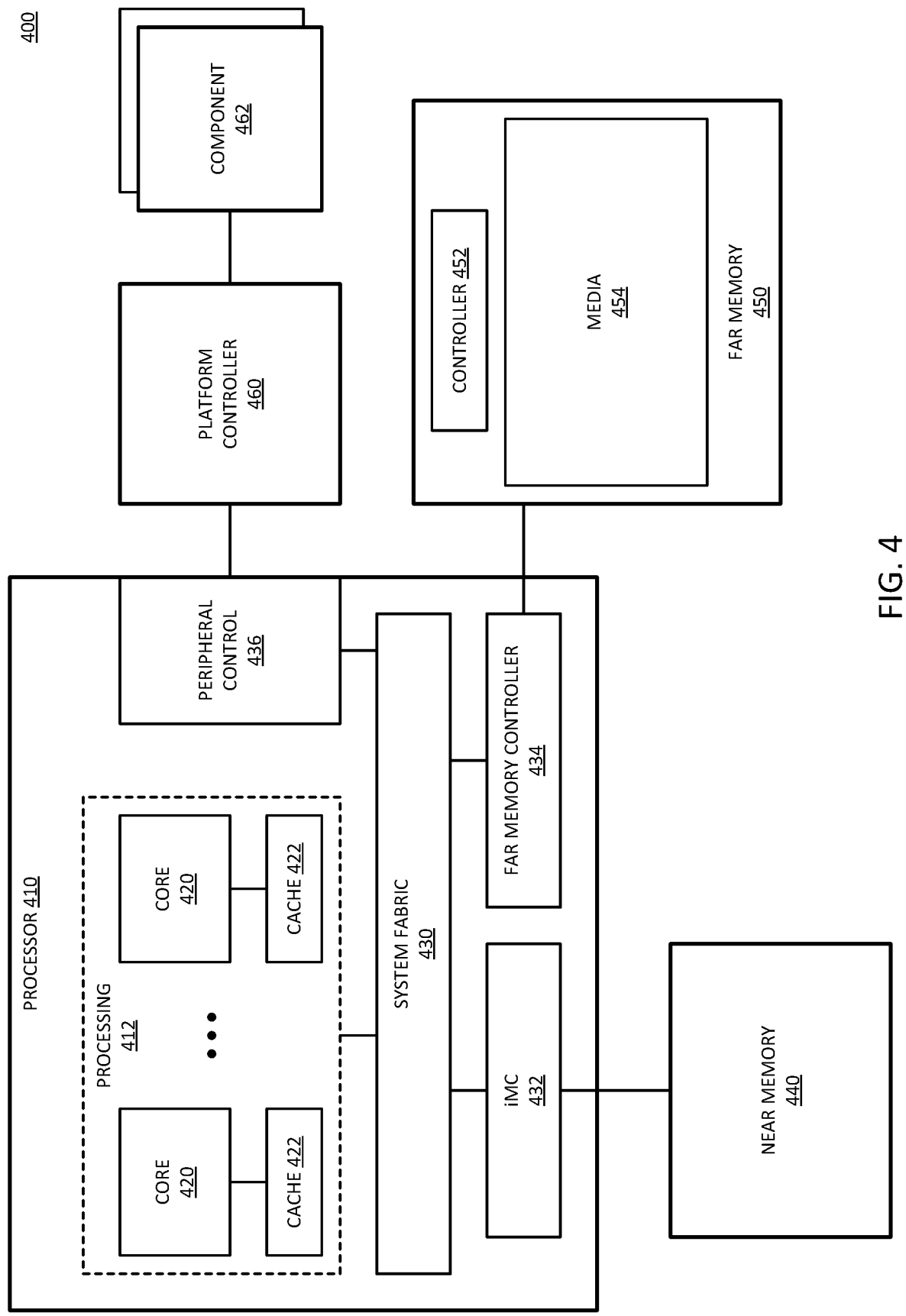
FIG. 4 is a block diagram of an example of a system with a memory subsystem having near memory and far memory with an integrated near memory controller and an integrated far memory controller.

FIG. 4 is a block diagram of an example of a system with a memory subsystem having near memory and far memory with an integrated near memory controller and an integrated far memory controller. System 400 provides one example of a system in accordance with system 100 of FIG. 1, where processor 410 represents the host and far memory 450 represents the memory device.

System 400 represents components of a multilevel memory system. System 400 specifically illustrates an integrated memory controller and integrated far memory controller. The integrated controllers are integrated onto a processor die or in a processor SOC package, or both.

Processor 410 represents an example of a processor die or a processor SOC package. Processor 410 includes processing units 412, which can include one or more cores 420 to perform the execution of instructions. In one example, cores 420 include processor side cache 422, which will include cache control circuits and cache data storage. Cache 422 can represent any type of processor side cache. In one example, individual cores 420 include local cache resources 422 that are not shared with other cores. In one example, multiple cores 420 share cache resources 422. In one example, individual cores 420 include local cache resources 422 that are not shared, and multiple cores 420 include shared cache resources. It is to be understood that in the system shown, processor side cache 422 may store both data and metadata on-die.

In one example, processor 410 includes system fabric 430 to interconnect components of the processor system. System fabric 430 can be or include interconnections between processing components 412, peripheral control 436, one or more memory controllers such as integrated memory controller (iMC) 432 and far memory controller 434, I/O controls (not specifically shown), graphics subsystem (not specifically shown), or other components. System fabric 430 enables the exchange of data signals among the components. While system fabric 430 is generically shown connecting the components, it will be understood that system 400 does not necessarily illustrate all component interconnections. System fabric 430 can represent one or more mesh connections, a central switching mechanism, a ring connection, a hierarchy of fabrics, or other topology.

In one example, processor 410 includes one or more peripheral controllers 436 to connect off resource to peripheral components or devices. In one example, peripheral controller 436 represents hardware interfaces to platform controller 460, which includes one or more components or circuits to control interconnection in a hardware platform or motherboard of system 400 to interconnect peripherals to processor 410. Components 462 represent any type of chip or interface or hardware element that couples to processor 410 via platform controller 460.

In one example, processor 410 includes iMC 432, which specifically represents control logic to connect to near memory 440. In one example, near memory 440 is what is traditionally considered the main memory of system 400. The main memory refers to a memory resource accessed when a cache miss occurs on a last level of cache 422. iMC 432 can include hardware circuits and software/firmware control logic. In one example, near memory 440 represents a volatile memory resource.

In one example, processor 410 includes far memory controller 434, which represents control logic to control access to far memory 450. Far memory 450 represents a memory resource that has an access time longer than the access time to near memory 440. In one example, far memory 450 includes a nonvolatile memory resource. Far memory controller 434 can include hardware circuits and software/firmware control logic. Both iMC 432 and far memory controller 434 can include scheduling logic to manage access to their respective memory resources.

Far memory 450 includes media 454, which represents a storage media where far memory 450 stores data for system 400. In one example, far memory 450 includes controller 452, which represents a controller in far memory 450 that can dynamically determine whether to access media 454 with a first or a second read access mode. One of the read access modes can be a latency-focused mode where controller 452 accesses media 454 to read data in response to a command from processor 410 with the shortest read latency. In the latency-focused mode, controller 452 accesses media 454 for smaller segments of memory, based on what is requested in the command from processor 410. The other access mode can be a bandwidth-focused mode where controller 452 accesses media 454 to read data in larger segments, even when processor 410 issues a command requesting smaller segments. In the bandwidth-focused mode, processor 452 prefetches data in response to a read command from processor 410.

In one example, near memory 440 includes DRAM memory module or modules as main memory. In one example, far memory 450 includes a 3DXP memory. Thus, media 454 can be or include 3DXP memory, which is understood to have slower, but comparable, read times as compared to DRAM, and significantly slower write times as compared to DRAM. However, 3DXP is nonvolatile and therefore does not need to be refreshed like DRAM, allowing a lower standby power. A memory subsystem in accordance with system 400 can include 3DXP far memory 450 and a DRAM-based near memory 440. Overall power usage will be improved, and access performance should be comparable.

In place of 3DXP, other memory technologies such as phase change memory (PCM) or other nonvolatile memory technologies could be used. Nonlimiting examples of nonvolatile memory may include any or a combination of: solid state memory (such as planar or 3D NAND flash memory or NOR flash memory), storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some examples, 3D crosspoint memory may comprise a transistor-less stackable cross point architecture in which memory cells sit at the intersection of wordlines and bitlines and are individually addressable and in which bit storage is based on a change in bulk resistance.

Figure 5:
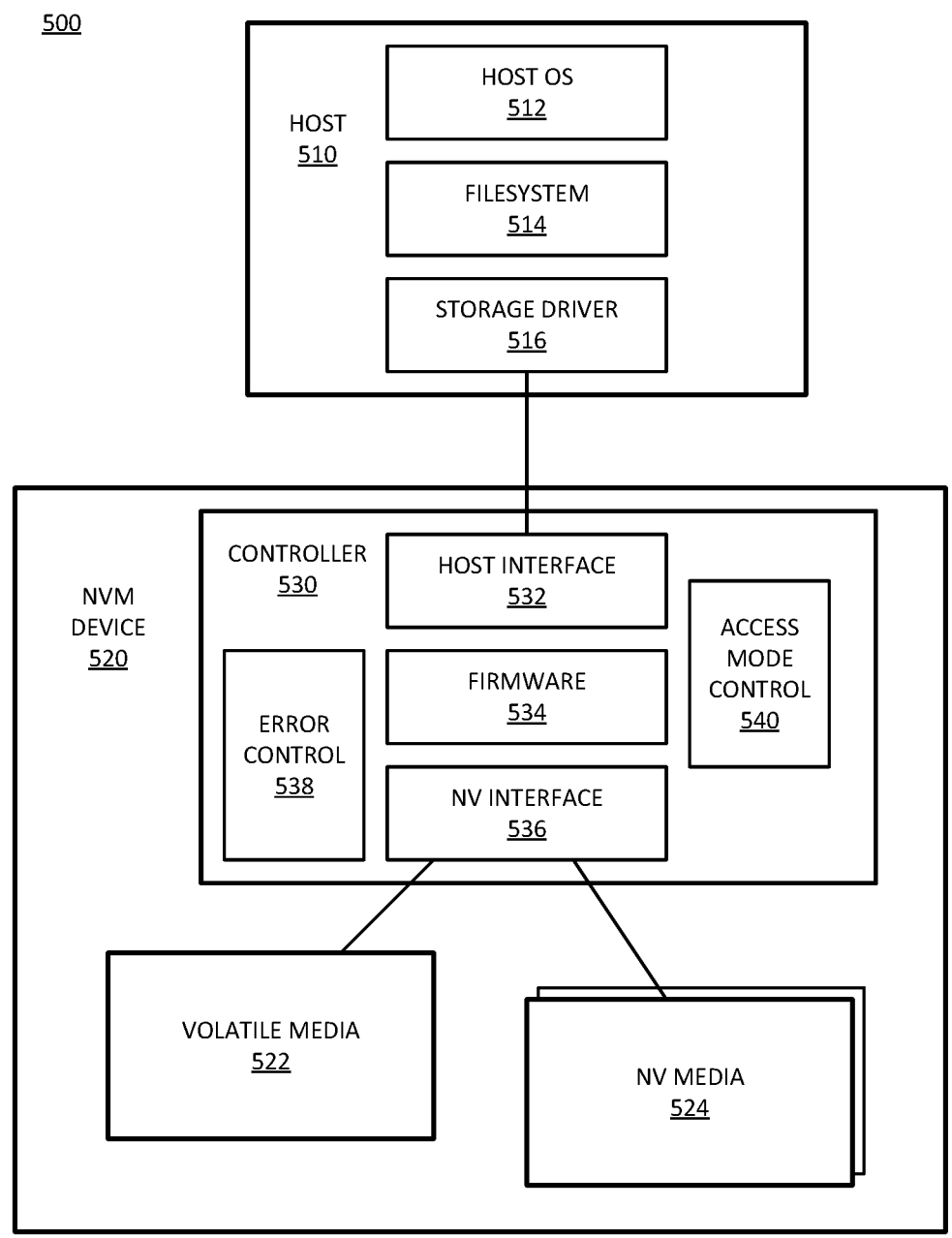
FIG. 5 is a block diagram of an example of a nonvolatile storage system with access mode control to change control based on how many read requests are queued.

FIG. 5 is a block diagram of an example of a nonvolatile storage system with access mode control to change control based on how many read requests are queued. System 500 provides one example of a system in accordance with system 100 of FIG. 1, where host 510 represents the host and NVM device 520 represents the memory device.

System 500 includes NVM (nonvolatile memory) device 520 coupled with host 510. In one example, NVM device 520 represents an nth level memory or a byte addressable nonvolatile memory device coupled to a main memory bus. In one example, NVM device 520 is a solid state drive (SSD). Host 510 represents a host hardware platform that connects to NVM device 520. Host 510 includes a CPU (central processing unit) or other processor as a host processor to execute host OS 512. Host 510 can include a motherboard or hardware board, a chipset or other hardware components to interconnect host 510 to NVM device 520.

System 500 illustrates the logical layers of the host and NVM device. Host OS 512 represents a host operating system or software platform for the host. Host OS 512 can include a platform on which applications, services, agents, and/or other software executes, and is executed by a processor. Filesystem 514 represents control logic for controlling access to NVM device 520. Filesystem 514 can manage what addresses or memory locations are used to store what data. There are numerous filesystems known, and filesystem 514 can implement known filesystems or other proprietary systems. In one example, filesystem 514 is part of host OS 512.

Storage driver 516 represents one or more system-level modules that control the hardware of host 510. In one example, drivers 516 include a software application to control the interface to NVM device 520, and thus control the hardware of NVM device 520. Storage driver 516 can provide a communication interface between the host and the NVM device.

NVM device 520 represents a storage drive that includes a primary nonvolatile (NV) media to store data, represented by NV media 524. Volatile media 522 represents a smaller, faster media to act as a buffer or cache for NV media 524. NVM device 520 includes controller 530 to control access to buffer 522 and NV media 524. Controller 530 represents hardware and control logic within NVM device 520 to execute control over the media.

Controller 530 includes firmware 534, which represents control software/firmware for the controller. In one example, controller 530 includes host interface 532, which represents an interface to host 510. In one example, controller 530 includes NV interface 536, which represents an interface to volatile media 522 and NV media 524. It will be understood that NV interface 536 can interface with a volatile memory device as a buffer for the NV media.

Interfaces 532 and 536 include control that is executed on hardware of controller 530. It will be understood that controller 530 includes hardware to interface with host 510, which can be considered to be controlled by host interface software/firmware 532. Likewise, it will be understood that controller 530 includes hardware to interface with volatile media 522 and NV media 534. In one example, code for host interface 532 can be part of firmware 534. In one example, code for NV interface 536 can be part of firmware 534.

In one example, controller 530 includes error control 538 to handle data errors in accessed data, and corner cases in terms of compliance with signaling and communication interfacing. In one example, error control 538 is implemented in hardware. In one example, error control 538 is implemented within firmware 534. In one example, error control 538 is implemented as a combination of hardware and firmware.

Access mode control 540 represents logic within controller 530 to dynamically change between a read latency focused read mode and a bandwidth focused read mode, in accordance with any example described herein. With latency focus, controller 530 accesses only the data requested from host 510 as quickly as it can be accessed and returned. With bandwidth focus, controller accesses more data than is requested, unless the data requested has already been prefetched, and caches or buffers the data to improve output bandwidth back to host 510. In one example, controller 530 includes parameters (not specifically shown) to determine when to trigger a switch from latency focus to bandwidth focus.

In one example, NV media 524 includes a crosspoint memory media. In one example, NV media 524 includes a stacked memory device with multiple tiers of storage cells. In one example, NVM device 520 includes a PCB (printed circuit board) or module on which components of the device are mounted. In one example, controller 530 represents a media controller on a PCB module that includes multiple separate persistent media dies. One or more of the persistent media dies can include a multi-tier stack or 3D stack of memory.

Reference to volatile memory refers to a memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. Reference herein to volatile memory can include a DRAM (dynamic random access memory) device, or some variant such as synchronous DRAM (SDRAM). A memory subsystem may be compatible with a number of memory technologies, such as DDR4 (double data rate (DDR) version 4, JESD79, initial specification published in September 2012 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, currently in discussion by JEDEC), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Reference to nonvolatile memory device or persistent memory can include nonvolatile memory device that is a block addressable memory device, such as NAND or NOR technologies. Additionally, nonvolatile memory can refer to a byte addressable memory, such as a three dimensional crosspoint memory device, other byte addressable nonvolatile memory devices, or memory devices that use chalcogenide phase change material (e.g., chalcogenide glass), or memory devices that store data based on a resistive state of the storage media. In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Figure 6:
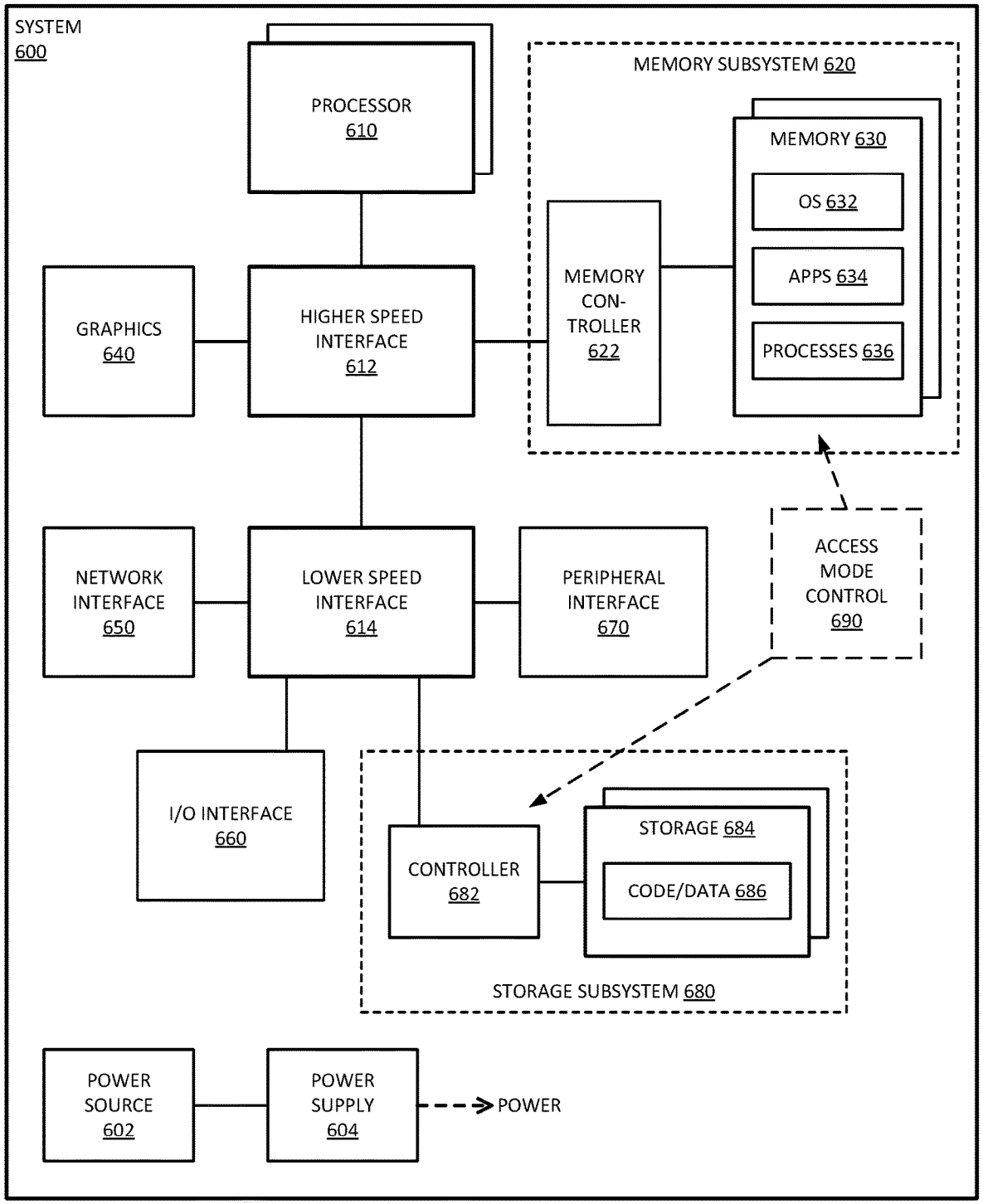
FIG. 6 is a block diagram of an example of a computing system in which switching between read modes based on queue depth can be implemented.

FIG. 6 is a block diagram of an example of a computing system in which switching between read modes based on queue depth can be implemented. System 600 represents a computing device in accordance with any example herein, and can be a laptop computer, a desktop computer, a tablet computer, a server, a gaming or entertainment control system, embedded computing device, or other electronic device. System 600 provides an example of a system in accordance with system 100.

More specifically, processor 610 and a host OS executed by the processor can represent a host, with memory resources in memory subsystem 620 or memory resources in storage subsystem 680 as the memory device. In one example, system 600 includes access mode control 690, which represents components to enable the dynamic switching between different read modes for a memory media, in accordance with any example herein. In one example, access mode control 690 can be part of controller 682 of storage subsystem 680. In one example, access mode control 690 can be part of a controller on a memory device of memory 630, where the controller is not specifically shown. The controller will be understood as a media controller, which may be different from memory controller 622. In one example, the memory controller can include the media controller.

System 600 includes processor 610 can include any type of microprocessor, central processing unit (CPU), graphics processing unit (GPU), processing core, or other processing hardware, or a combination, to provide processing or execution of instructions for system 600. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 600 includes interface 612 coupled to processor 610, which can represent a higher speed interface or a high throughput interface for system components that need higher bandwidth connections, such as memory subsystem 620 or graphics interface components 640. Interface 612 represents an interface circuit, which can be a standalone component or integrated onto a processor die. Interface 612 can be integrated as a circuit onto the processor die or integrated as a component on a system on a chip. Where present, graphics interface 640 interfaces to graphics components for providing a visual display to a user of system 600. Graphics interface 640 can be a standalone component or integrated onto the processor die or system on a chip. In one example, graphics interface 640 can drive a high definition (HD) display that provides an output to a user. In one example, the display can include a touchscreen display. In one example, graphics interface 640 generates a display based on data stored in memory 630 or based on operations executed by processor 610 or both.

Memory subsystem 620 represents the main memory of system 600, and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610, such as integrated onto the processor die or a system on a chip.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 600 includes interface 614, which can be coupled to interface 612. Interface 614 can be a lower speed interface than interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example, controller 682 is a physical part of interface 614 or processor 610, or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

Figure 7:
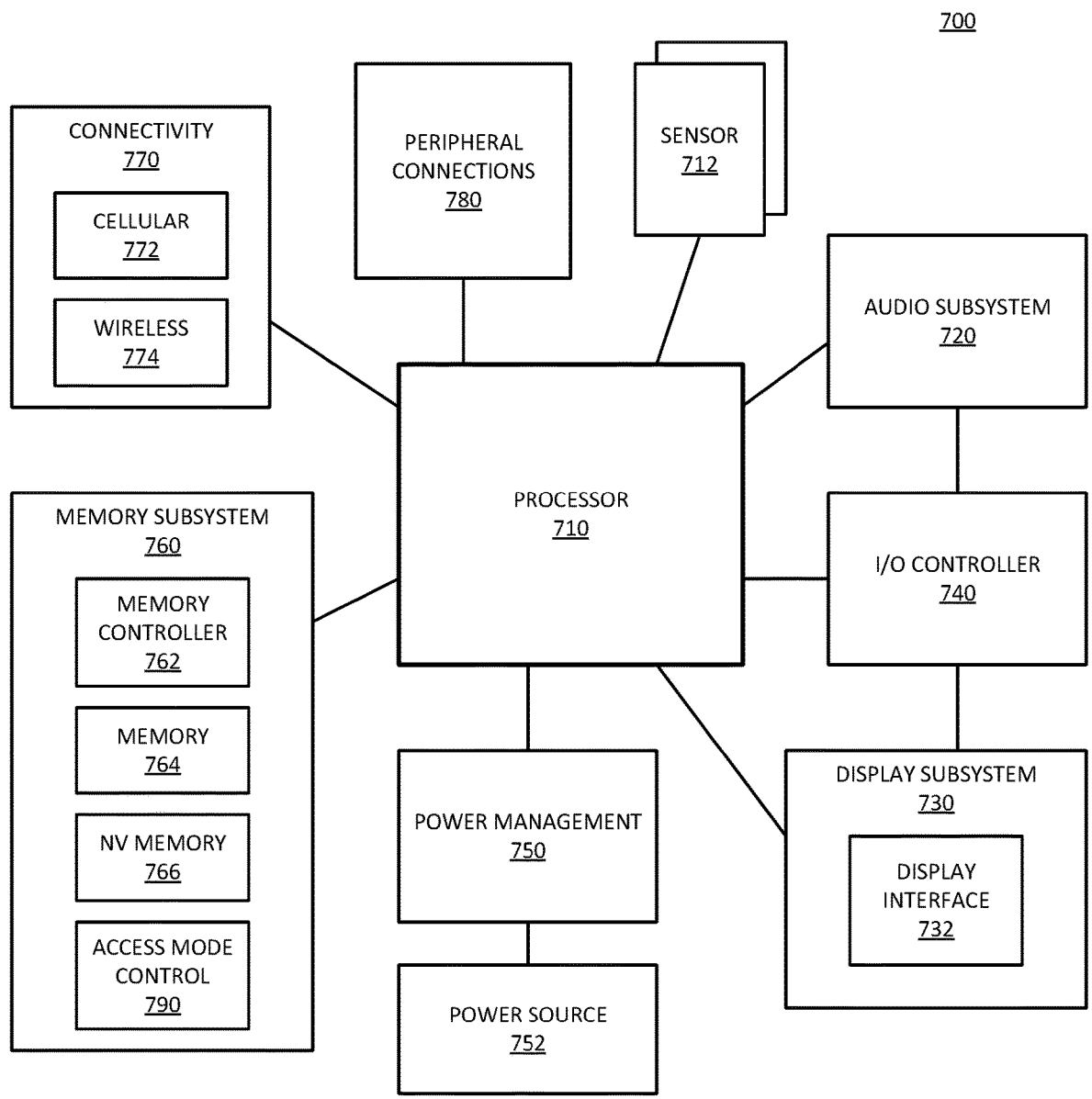
FIG. 7 is a block diagram of an example of a mobile device in which switching between read modes based on queue depth can be implemented.

FIG. 7 is a block diagram of an example of a mobile device in which switching between read modes based on queue depth can be implemented. System 700 represents a mobile computing device, such as a computing tablet, a mobile phone or smartphone, wearable computing device, or other mobile device, or an embedded computing device. It will be understood that certain of the components are shown generally, and not all components of such a device are shown in system 700. System 700 provides an example of a system in accordance with system 100.

More specifically, processor 710 and a host OS executed by the processor can represent a host, with memory resources in memory subsystem 760 as the memory device. In one example, system 700 includes access mode control 790 in memory subsystem 760, which represents components to enable the dynamic switching between different read modes for a memory media, in accordance with any example herein. In one example, access mode control 790 can be part of a controller of NV memory 766. In one example, memory subsystem 760 includes NV memory 766, which represents a memory with nonvolatile media that can persistently store data. In one example, the media controller for NV memory 766 includes access mode control 790. The controller to access the media and implement the access mode control is understood as a media controller, which may be different from memory controller 762. In one example, the memory controller can include the media controller.

Device 700 includes processor 710, which performs the primary processing operations of system 700. Processor 710 can include one or more physical devices, such as microprocessors, application processors, microcontrollers, programmable logic devices, or other processing means. The processing operations performed by processor 710 include the execution of an operating platform or operating system on which applications and device functions are executed. The processing operations include operations related to I/O (input/output) with a human user or with other devices, operations related to power management, operations related to connecting system 700 to another device, or a combination. The processing operations can also include operations related to audio I/O, display I/O, or other interfacing, or a combination. Processor 710 can execute data stored in memory. Processor 710 can write or edit data stored in memory.

In one example, system 700 includes one or more sensors 712. Sensors 712 represent embedded sensors or interfaces to external sensors, or a combination. Sensors 712 enable system 700 to monitor or detect one or more conditions of an environment or a device in which system 700 is implemented. Sensors 712 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 712 can also include sensors for biometric systems such as fingerprint recognition systems, face detection or recognition systems, or other systems that detect or recognize user features. Sensors 712 should be understood broadly, and not limiting on the many different types of sensors that could be implemented with system 700. In one example, one or more sensors 712 couples to processor 710 via a frontend circuit integrated with processor 710. In one example, one or more sensors 712 couples to processor 710 via another component of system 700.

In one example, system 700 includes audio subsystem 720, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 700, or connected to system 700. In one example, a user interacts with system 700 by providing audio commands that are received and processed by processor 710.

Display subsystem 730 represents hardware (e.g., display devices) and software components (e.g., drivers) that provide a visual display for presentation to a user. In one example, the display includes tactile components or touchscreen elements for a user to interact with the computing device. Display subsystem 730 includes display interface 732, which includes the particular screen or hardware device used to provide a display to a user. In one example, display interface 732 includes logic separate from processor 710 (such as a graphics processor) to perform at least some processing related to the display. In one example, display subsystem 730 includes a touchscreen device that provides both output and input to a user. In one example, display subsystem 730 includes a high definition (HD) or ultra-high definition (UHD) display that provides an output to a user. In one example, display subsystem includes or drives a touchscreen display. In one example, display subsystem 730 generates display information based on data stored in memory or based on operations executed by processor 710 or both.

I/O controller 740 represents hardware devices and software components related to interaction with a user. I/O controller 740 can operate to manage hardware that is part of audio subsystem 720, or display subsystem 730, or both. Additionally, I/O controller 740 illustrates a connection point for additional devices that connect to system 700 through which a user might interact with the system. For example, devices that can be attached to system 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 or display subsystem 730 or both. For example, input through a microphone or other audio device can provide input or commands for one or more applications or functions of system 700. Additionally, audio output can be provided instead of or in addition to display output. In another example, if display subsystem includes a touchscreen, the display device also acts as an input device, which can be at least partially managed by I/O controller 740. There can also be additional buttons or switches on system 700 to provide I/O functions managed by I/O controller 740.

In one example, I/O controller 740 manages devices such as accelerometers, cameras, light sensors or other environmental sensors, gyroscopes, global positioning system (GPS), or other hardware that can be included in system 700, or sensors 712. The input can be part of direct user interaction, as well as providing environmental input to the system to influence its operations (such as filtering for noise, adjusting displays for brightness detection, applying a flash for a camera, or other features).

In one example, system 700 includes power management 750 that manages battery power usage, charging of the battery, and features related to power saving operation. Power management 750 manages power from power source 752, which provides power to the components of system 700. In one example, power source 752 includes an AC to DC (alternating current to direct current) adapter to plug into a wall outlet. Such AC power can be renewable energy (e.g., solar power, motion based power). In one example, power source 752 includes only DC power, which can be provided by a DC power source, such as an external AC to DC converter. In one example, power source 752 includes wireless charging hardware to charge via proximity to a charging field. In one example, power source 752 can include an internal battery or fuel cell source.

Memory subsystem 760 includes memory device(s) 762 for storing information in system 700. Memory subsystem 760 can include nonvolatile (state does not change if power to the memory device is interrupted) or volatile (state is indeterminate if power to the memory device is interrupted) memory devices, or a combination. Memory 760 can store application data, user data, music, photos, documents, or other data, as well as system data (whether long-term or temporary) related to the execution of the applications and functions of system 700. In one example, memory subsystem 760 includes memory controller 764 (which could also be considered part of the control of system 700, and could potentially be considered part of processor 710). Memory controller 764 includes a scheduler to generate and issue commands to control access to memory device 762.

Connectivity 770 includes hardware devices (e.g., wireless or wired connectors and communication hardware, or a combination of wired and wireless hardware) and software components (e.g., drivers, protocol stacks) to enable system 700 to communicate with external devices. The external device could be separate devices, such as other computing devices, wireless access points or base stations, as well as peripherals such as headsets, printers, or other devices. In one example, system 700 exchanges data with an external device for storage in memory or for display on a display device. The exchanged data can include data to be stored in memory, or data already stored in memory, to read, write, or edit data.

Connectivity 770 can include multiple different types of connectivity. To generalize, system 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that system 700 could both be a peripheral device ("to" 782) to other computing devices, as well as have peripheral devices ("from" 784) connected to it. Device 700 commonly has a "docking" connector to connect to other computing devices for purposes such as managing (e.g., downloading, uploading, changing, synchronizing) content on system 700. Additionally, a docking connector can allow system 700 to connect to certain peripherals that allow system 700 to control content output, for example, to audiovisual or other systems.

In addition to a proprietary docking connector or other proprietary connection hardware, system 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example a memory device includes: a persistent storage media accessible as data chunks having a size at least equal to an access size of a volatile media cache; and a media controller to control access to the persistent storage media, the media controller to dynamically switch between a first read mode and a second read mode based on a number of read commands pending in a command queue, the first read mode to access only a data chunk addressed in a pending command, and the second read mode to access a data chunk addressed in a pending command and prefetch contiguous data chunks of a block of data.

In one example, the persistent storage media comprises a crosspoint memory media having multiple tiers of storage cells. In one example, media controller comprises a controller on printed circuit board (PCB) module having multiple persistent media dies. In one example, the media controller is to default to the first read mode and switch to the second read mode in response to a threshold number of read commands pending in the command queue. In one example, the memory device further includes: a register to store a programmable value to set the threshold number to trigger a switch from the first read mode to the second read mode. In one example, the media controller is to switch from the second read mode to the first read mode in response to the command queue not having pending read commands. In one example, the memory device further includes a prefetch buffer to store the prefetched block of data. In one example, in the second read mode, in response to a read command addressed to a data chunk within the block of data that is already prefetched, the media controller is to return the data chunk from the prefetch buffer. In one example, in the second read mode, in response to a read command addressed to a data chunk within the block of data, the media controller is to queue the read command to await prefetch of the block of data.

In general with respect to the descriptions herein, in one example a system includes: a volatile memory device including volatile media as near memory for a processor; and a persistent memory device including persistent storage media as far memory for the processor, the persistent memory device including a persistent storage media as far memory for the processor, the persistent storage media accessible as data chunks having a size at least equal to an access size of the volatile media; and a media controller to control access to the persistent storage media, the media controller to dynamically switch between a first read mode and a second read mode based on a number of read commands pending in a command queue, the first read mode to access only a data chunk addressed in a pending command, and the second read mode to access a data chunk addressed in a pending command and prefetch contiguous data chunks of a block of data.

In one example, the media controller is to default to the first read mode and switch to the second read mode in response to a threshold number of read commands pending in the command queue. In one example, the persistent memory further comprising: a register to store a programmable value to set the threshold number to trigger a switch from the first read mode to the second read mode, wherein the media controller is to switch from the second read mode to the first read mode in response to the command queue not having pending read commands. In one example, the persistent memory includes a hard-coded value to set the threshold number to trigger a switch from the first read mode to the second read mode, wherein the media controller is to switch from the second read mode to the first read mode in response to the command queue not having pending read commands. In one example, the persistent memory further comprising: a prefetch buffer to store the prefetched block of data. In one example, in the second read mode, in response to a read command addressed to a data chunk within the block of data that is already prefetched, the media controller is to return the data chunk from the prefetch buffer; and, wherein in the second read mode, in response to a read command addressed to a data chunk within the block of data, the media controller is to queue the read command to await prefetch of the block of data. In one example, the system further includes one or more of: a host processor device coupled to the volatile memory device and the persistent memory device; a display communicatively coupled to a host processor; a network interface communicatively coupled to a host processor; or a battery to power the system.

In general with respect to the descriptions herein, in one example a method for storing data includes: receiving a read command from a host controller; determining if a number of read commands pending in a command queue meets or exceeds a threshold number of read command in the command queue; and in response to a determination that the number of read commands meets or exceeds the threshold number, dynamically switching from a first read mode to a second read mode, the first read mode to access only a data chunk addressed in a pending command, and the second read mode to access a data chunk addressed in a pending command and prefetch contiguous data chunks of a block of data.

In one example, dynamically switching from the first read mode to the second read mode comprises: defaulting to the first read mode; and switching to the second read mode in response to a threshold number of read commands pending in the command queue. In one example, the method further includes: storing a programmable value in a register to set the threshold number to trigger a switch from the first read mode to the second read mode, wherein switching from the second read mode to the first read mode comprises switching in response to the command queue not having pending read commands. In one example, the method further includes storing the prefetched block of data in a prefetch buffer. In one example, in the second read mode, in response to a read command addressed to a data chunk within the block of data that is already prefetched, returning the data chunk from the prefetch buffer; and, in response to a read command addressed to a data chunk within the block of data, queuing the read command to await prefetch of the block of data.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory device comprising:
    a persistent storage media accessible as data chunks having a size at least equal to an access size of a volatile media cache;
    a media controller to control access to the persistent storage media, the media controller to dynamically switch between a first read mode and a second read mode based on a number of read commands pending in a command queue, the first read mode to access only a data chunk addressed in a pending command, and the second read mode to access a data chunk addressed in a pending command and prefetch contiguous data chunks of a block of data; and
    a prefetch buffer to store the prefetched block of data, wherein in the second read mode, in response to a read command addressed to a data chunk within the block of data, the media controller is to queue the read command to await prefetch of the block of data.

2. The memory device of claim 1, wherein the persistent storage media comprises a crosspoint memory media having multiple tiers of storage cells.

3. The memory device of claim 1, wherein the media controller comprises a controller on printed circuit board (PCB) module having multiple persistent media dies.

4. The memory device of claim 1, wherein the media controller is to default to the first read mode and switch to the second read mode in response to a threshold number of read commands pending in the command queue.

5. The memory device of claim 4, further comprising:
    a register to store a programmable value to set the threshold number to trigger a switch from the first read mode to the second read mode.

6. The memory device of claim 4, wherein the media controller is to switch from the second read mode to the first read mode in response to the command queue not having pending read commands.

7. The memory device of claim 1, wherein in the second read mode, in response to a read command addressed to a data chunk within the block of data that is already prefetched, the media controller is to return the data chunk from the prefetch buffer.

8. A system comprising:
    a volatile memory device including volatile media as near memory for a processor; and
    a persistent memory device including persistent storage media as far memory for the processor, the persistent memory device including
        a persistent storage media as far memory for the processor, the persistent storage media accessible as data chunks having a size at least equal to an access size of the volatile media;
        a media controller to control access to the persistent storage media, the media controller to dynamically switch between a first read mode and a second read mode based on a number of read commands pending in a command queue, the first read mode to access only a data chunk addressed in a pending command, and the second read mode to access a data chunk addressed in a pending command and prefetch contiguous data chunks of a block of data: and
        a prefetch buffer to store the prefetched block of data, wherein in the second read mode, in response to a read command addressed to a data chunk within the block of data, the media controller is to queue the read command to await prefetch of the block of data.

9. The system of claim 8, wherein the media controller is to default to the first read mode and switch to the second read mode in response to a threshold number of read commands pending in the command queue.

10. The system of claim 9, the persistent memory device further comprising:
a register to store a programmable value to set the threshold number to trigger a switch from the first read mode to the second read mode, wherein the media controller is to switch from the second read mode to the first read mode in response to the command queue not having pending read commands.

11. The system of claim 9, wherein the persistent memory device includes a hard-coded value to set the threshold number to trigger a switch from the first read mode to the second read mode, wherein the media controller is to switch from the second read mode to the first read mode in response to the command queue not having pending read commands.

12. The system of claim 8, wherein in the second read mode, in response to a read command addressed to a data chunk within the block of data that is already prefetched, the media controller is to return the data chunk from the prefetch buffer.

13. The system of claim 8, further comprising one or more of:
a host processor device coupled to the volatile memory device and the persistent memory device;
a display communicatively coupled to a host processor;
a network interface communicatively coupled to a host processor; or
a battery to power the system.

14. A method for storing data, comprising:
receiving a read command from a host controller;
determining if a number of read commands pending in a command queue meets or exceeds a threshold number of read command in the command queue;
in response to a determination that the number of read commands meets or exceeds the threshold number, dynamically switching from a first read mode to a second read mode, the first read mode to access only a data chunk addressed in a pending command, and the second read mode to access a data chunk addressed in a pending command and prefetch contiguous data chunks of a block of data;
storing the prefetched block of data in a prefetch buffer; and
in response to a read command addressed to a data chunk within the block of data, queuing the read command to await prefetch of the block of data.

15. The method of claim 14, wherein dynamically switching from the first read mode to the second read mode comprises:
defaulting to the first read mode; and
switching to the second read mode in response to a threshold number of read commands pending in the command queue.

16. The method of claim 14, further comprising:
storing a programmable value in a register to set the threshold number to trigger a switch from the first read mode to the second read mode, wherein switching from the second read mode to the first read mode comprises switching in response to the command queue not having pending read commands.

17. The method of claim 14, wherein in the second read mode, in response to a read command addressed to a data chunk within the block of data that is already prefetched, returning the data chunk from the prefetch buffer.

* * * * *